US011660761B2

(12) United States Patent
Gao et al.

(10) Patent No.: US 11,660,761 B2
(45) Date of Patent: May 30, 2023

(54) FLEXIBLE ROBOTIC SYSTEM USING END-EFFECTOR WITH PASS-THROUGH SUCTION MODULES

(71) Applicant: GM GLOBAL TECHNOLOGY OPERATIONS LLC, Detroit, MI (US)

(72) Inventors: Dalong Gao, Rochester, MI (US); Ningjian Huang, Bingham Farms, MI (US); Yhu-tin Lin, Rochester Hills, MI (US); Roberto Hirayama, Sao Paulo (BR)

(73) Assignee: GM GLOBAL TECHNOLOGY OPERATIONS, LLC, Detroit, MI (US)

( * ) Notice: Subject to any disclaimer, the term of this patent is extended or adjusted under 35 U.S.C. 154(b) by 380 days.

(21) Appl. No.: 17/030,513

(22) Filed: Sep. 24, 2020

(65) Prior Publication Data

US 2022/0088799 A1    Mar. 24, 2022

(51) Int. Cl.
*B25J 15/06* (2006.01)
*B25J 15/04* (2006.01)
*B62D 65/02* (2006.01)
*B25J 15/00* (2006.01)

(52) U.S. Cl.
CPC ....... *B25J 15/0616* (2013.01); *B25J 15/0028* (2013.01); *B25J 15/04* (2013.01); *B25J 15/0408* (2013.01); *B62D 65/022* (2013.01)

(58) Field of Classification Search
CPC .... B25J 15/0028; B25J 15/04; B25J 15/0408; B25J 15/0416; B25J 15/0433; B25J 15/0441; B25J 15/045; B25J 15/0458; B25J 15/0616; B25J 15/0683; B25J 15/0691
See application file for complete search history.

(56) References Cited

U.S. PATENT DOCUMENTS

| 5,814,173 A * | 9/1998 | Stone | B29C 65/48 156/391 |
| 11,097,432 B2 * | 8/2021 | Lin | B25J 17/00 |
| 2016/0339590 A1 * | 11/2016 | Lin | B25J 15/0408 |
| 2019/0344453 A1 * | 11/2019 | Harter | B25J 15/0616 |
| 2022/0219917 A1 * | 7/2022 | Yang | B25J 5/02 |
| 2022/0266458 A1 * | 8/2022 | Fofonoff | B25J 15/0491 |

FOREIGN PATENT DOCUMENTS

| DE | 3344903 A1 | 6/1985 |
| DE | 102012016721 A1 | 2/2014 |
| DE | 102018111487 A1 | 11/2019 |
| EP | 1862237 B1 | 10/2008 |
| EP | 2796263 B1 | 10/2017 |
| JP | 2017202491 A | 11/2017 |

* cited by examiner

*Primary Examiner* — Saul Rodriguez
*Assistant Examiner* — Brendan P Tighe
(74) *Attorney, Agent, or Firm* — Lorenz & Kopf LLP

(57) ABSTRACT

Robotic systems are provided for flexibility in assembly operations. A robotic system includes a suction module having a front side with a face shaped to match a mating component and a rear side with a coupling for a suction line. Openings extend through the face. The suction module defines internal passages connecting the coupling with the at least one opening through the face. An end-effector has a base plate, a mounting plate selectively moveable relative to the base plate, and a clamp. The suction module is selectively mounted to the mounting plate and releasably secured by the clamp. An actuator is mounted to selectively move the mounting plate and the suction module relative to the base plate.

20 Claims, 7 Drawing Sheets

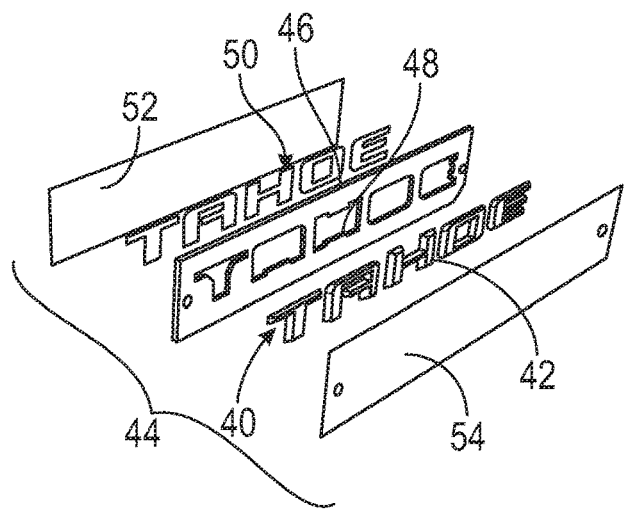
FIG. 2
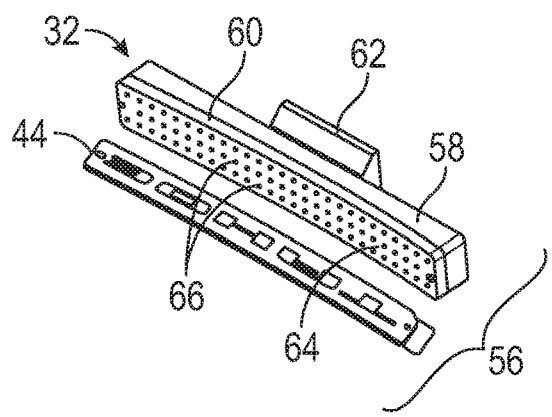
FIG. 3
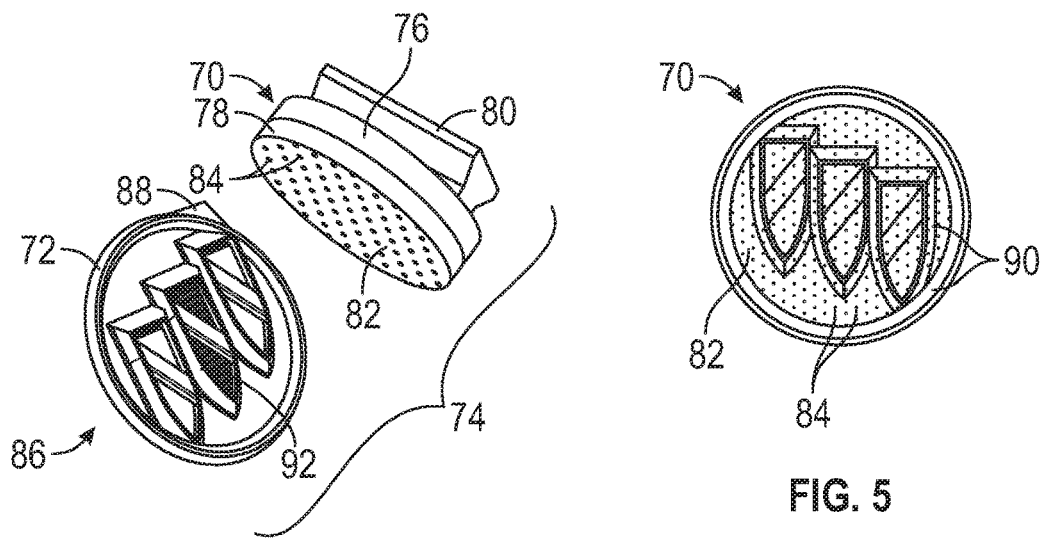
FIG. 4
FIG. 5

FLEXIBLE ROBOTIC SYSTEM USING END-EFFECTOR WITH PASS-THROUGH SUCTION MODULES

INTRODUCTION

The present disclosure generally relates to automated assembly, and more particularly relates to a flexible robotic system using an end-effector that includes pass-through suction modules to pick up, manipulate, and apply components with multiple variations, such as emblems.

Carrying out certain assembly operations with accuracy is often challenging. For example, applying an emblem to a vehicle involves a number of steps that must be carried out with precision. In addition, vehicle assembly involves applying a wide variety of emblems to vehicles on the same assembly line. Emblems convey a sense of style and identity and are, therefore, important features that are added near the end of a vehicle's assembly process. Manual application of emblems is time consuming and may have inconsistent precision and quality. Emblems applied on a common assembly line often have different shapes, sizes, materials and packages, complicating the process. In certain cases, the wet-out force, which is the force specified for application of the emblems, is an important specification. Applying a consistent and strong enough force, while at the same time precisely positioning the emblem, is a challenge.

Robots have come into widespread use, including for application in assembly operations that are difficult to accomplish manually. Vehicle assembly plants have used robots for spot welding and painting. These applications use relatively simple end-effectors such as paint sprayers and spot welders. Each assembly application uses its own type of end-effector. Robotic systems and end-effectors for the efficient application of a wide variety of vehicle emblems are currently not available, and their design, features and operating principles are unknown.

Accordingly, it is desirable to provide robotic systems that efficiently, accurately and repeatably carry out assembly operations according to tight specifications, such as the application of emblems to vehicles. In addition, the flexibility to apply emblems of various styles using the same robot is desirable. Furthermore, other desirable features and characteristics of the present invention will become apparent from the subsequent detailed description and the appended claims, taken in conjunction with the accompanying drawings and the foregoing technical field and background.

SUMMARY

A number of embodiments include a robotic system that uses an end-effector with pass-through suction modules to pick up, manipulate, and apply components with multiple variations, such as emblems. In various embodiments, a robotic system is configured to manipulate plural component variations, such as a variety of emblems. The system includes a suction module shaped to mate with one of the component variations. The suction module has a front side with a face shaped to match and mate with the one component variation. The suction module has a rear side with a coupling that is connectable with a suction line. One or more openings extend through the face and the suction module defines internal passages connecting the coupling with the opening(s) through the face. A mounting is provided on the robotic system so that the suction module is selectively mounted to the mounting and releasably secured thereto. This enables the robotic system to selectively carry one of a variety of suction modules. Each one of the variety of suction modules corresponds to one individual component variation of the plural component variations.

In an additional embodiment, an end effector couples the suction module into the robotic system. The end effector has a base, a clamp, and a set of three alignment devices for locating the end-effector relative to a mounting surface that receives the one component variation. The end effector carries the mounting for receiving the suction module.

In an additional embodiment, the mounting is a mounting plate that includes a hook, and the clamp includes a locking block. The suction module is selectively clamped between the locking block and the hook.

In an additional embodiment, the locking block is connected with an actuator by a rod. The actuator is configured to move the locking block to alternatively lock and release the suction module relative to the mounting plate.

In an additional embodiment, the suction module includes a groove network recessed into the face and shaped to match features of the one component variation.

In an additional embodiment, the actuator is mounted to the base and is configured to selectively move the mounting and the suction module relative to the base.

In an additional embodiment, the actuator includes a rod extending through the base and connecting with the mounting plate.

In an additional embodiment, the suction module includes a body that is rigid. An end-effector interface is disposed on a back side of the body and is connectable with the mounting. A front section is disposed on a front side of the body and is made of a resilient material.

In an additional embodiment, the internal passages extend through the body, the end-effector interface, and the front section.

In an additional embodiment, the one component variation includes an emblem carried in an emblem package that includes a foam carrier surrounding the emblem. The system includes a gripper on the suction module that includes an arm selectively moveable between an open position and a clamped position. When in the clamped position the arm clamps onto the foam carrier.

In an additional embodiment, a spring biases the arm to the open position, and an actuator selectively moves the arm to the closed position.

In a number of additional embodiments, a robotic system is configured for manipulating a number of different component variations. The system includes a suction module shaped to mate with one of the component variations. The suction module has a front side with a face shaped to match and mate with the one component variation. The suction module has a rear side with a coupling connectable with a suction line. At least one opening extends through the face and the suction module defines internal passages connecting the coupling with the opening(s) to enable suction to pass-through the suction module. An end-effector has a base plate, a mounting plate selectively moveable relative to the base plate, and a clamp. The suction module is selectively mounted to the mounting plate and releasably secured by the clamp to selectively carry a variety of suction modules. Each one of the suction modules corresponds to an individual component variation. An actuator is mounted to the base plate to selectively move the mounting plate and the suction module relative to the base plate.

In an additional embodiment, a set of three suction cups is mounted to the end-effector. The suction cups locate the end-effector relative to a mounting surface that receives the one component variation. The suction cups are coupled with a vacuum source for holding the end-effector against the mounting surface. The suction cups having vacuum openings that are open to the vacuum source.

In an additional embodiment, the mounting plate includes a hook, and the clamp includes a locking block. The suction module is selectively and releasably clamped between the locking block and the hook.

In an additional embodiment, the locking block is connected with an actuator by a rod. The actuator is configured to move the locking block to alternatively lock and release the suction module relative to the mounting plate.

In an additional embodiment, the suction module includes a groove network recessed into the face. The groove network is shaped to match features of the one component variation.

In an additional embodiment, the at least one actuator comprises a rod extending through the base plate and connecting with the mounting plate.

In an additional embodiment, the suction module includes a body that is rigid, an end-effector interface on a back side of the body that is connectable with the mounting, and a front section on a front side of the body. The front section includes a resilient material. The internal passages extend through the body, the end-effector interface, and the front section.

In an additional embodiment, the one component variation includes an emblem carried in an emblem package that includes a foam carrier surrounding the emblem. The system includes a gripper on the suction module that includes an arm selectively moveable between an open position and a clamped position. When in the clamped position the arm clamps onto the foam carrier.

In addition various embodiments, a robotic system is configured to manipulate plural emblem variations. The system includes a suction module shaped to mate with one of the emblem variations. The suction module has a front side with a face shaped to match and mate with the one emblem variation, and has a rear side that includes a coupling connectable with a suction line. One or more openings extend through the face and the suction module defines internal passages connecting the coupling with the opening(s) to enable suction to pass-through the suction module. An end-effector has a base plate, a mounting plate selectively moveable relative to the base plate, and a clamp. The suction module is selectively mounted to the mounting plate and is releasably secured by the clamp. The end-effector selectively carries a variety of suction modules one at a time. Each one of the various suction modules corresponds to an individual emblem variation. A set of three suction cups is mounted to the end-effector for locating the end-effector relative to a vehicle panel that receives the emblem. The suction cups are coupled with a vacuum source for holding the end-effector against the vehicle panel. An actuator is mounted to the base plate and selectively moves the mounting plate and the suction module relative to the base plate to apply an individual emblem to the vehicle panel.

BRIEF DESCRIPTION OF THE DRAWINGS

The exemplary embodiments will hereinafter be described in conjunction with the following drawing figures, wherein like numerals denote like elements, and wherein:

FIG. 2 is a perspective, exploded view of an emblem package for application using the robotic system of FIG. 1, in accordance with various embodiments;

FIG. 3 is a perspective illustration of a rectangular shaped, mating pass-through suction module and emblem package pair, in accordance with various embodiments;

FIG. 4 is a perspective illustration of a circular shaped, mating pass-through suction module and emblem package pair, in accordance with various embodiments;

FIG. 5 is a front view of the face of the pass-through suction module of FIG. 4, in accordance with various embodiments;

DETAILED DESCRIPTION

The following detailed description is merely exemplary in nature and is not intended to limit the application and uses. Furthermore, there is no intention to be bound by any expressed or implied theory presented in the preceding technical field, background, brief summary or the following detailed description.

In a number of embodiments, a robotic system may include interchangeable pass-through suction modules, each with an emblem specific front end, may include foam carrier/face liner removal features, and may include an integrated network for pass-through vacuum delivery and suction generation. In a number of embodiments, a robotic system includes a suction module having a front side with a face shaped to match a mating component and a rear side with a coupling for a suction line. Openings extend through the face. The suction module defines internal passages connecting the coupling with the openings through the face. An end-effector includes a base plate, a mounting plate selectively moveable relative to the base plate, and a clamp. The suction module may be selectively mounted to the mounting plate and releasably secured by the clamp. An actuator is mounted to selectively move the mounting plate and the suction module relative to the base plate. While embodiments described herein may apply to certain assembly applications such as emblem install, the current disclosure is not limited to any particular type of product, but is broadly applicable where the ability to manipulate components using suction is desirable.

As described herein, a robotic system may be a fully automatic system for installation of products such as emblems. A robot end-effector may be automatically reconfigured to receive a suction module configured for a specific product. The robot moves the end-effector to engage a specific suction module designed to pick up a specific emblem, manipulate the emblem, and apply it by placing it onto a matching product surface. The suction modules may include an internal channel network designed to deliver suction to a large portion of the emblem surface features. The suction module with carried emblem is pushed by the end-effector to its mounting surface to apply a specified wet-out force. The end-effector has compliance build-in to ensure a smooth wet-out process. In a number of embodiments, the suction modules have features to remove a face liner and foam carrier after install. A standardized interface is provided between the interchangeable suction modules and the end-effector. The system enables automatic emblem installation using collaborative robots in general assembly that efficiently, accurately and repeatably carry out operations according to tight specifications.

Figure 1:
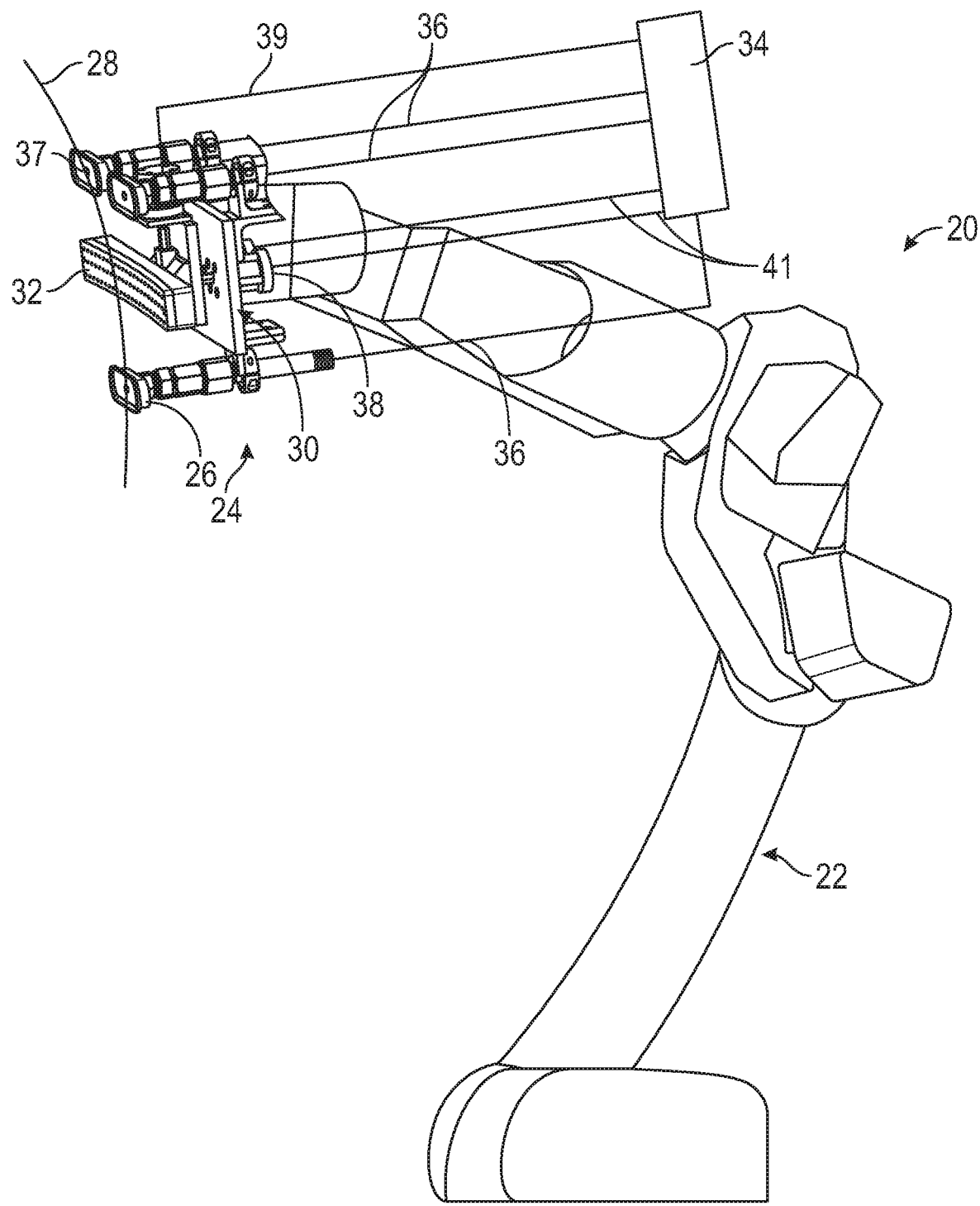
FIG. 1 is a perspective illustration of a robotic system, in accordance with various embodiments.

Referring to FIG. 1, illustrated is a robotic system 20 that in general, includes a robot 22 and an end-effector 24. The robot 22 may be a collaborative robot designed to work alongside humans in an assembly environment. In general, the end-effector 24 includes a set of three alignment devices, which in the current embodiment include suction cups 26 for location against a mating mounting surface, in this embodiment a vehicle panel 28, a fixture 30, and a pass-through type suction module 32. The end-effector 24 is configured for coupling with the robot 22 for manipulation thereby. The vehicle panel 28 is generally not flat and the inclusion of three self-aligning suction cups 26 ensures accurate mating with the surface of the vehicle panel 28. In a number of embodiments, the suction cups 26 may be adjustable to mate with a different vehicle panel. The suctions cups 26 are coupled with a vacuum source, which in this embodiment is depicted generically as a vacuum/pressure source 34. The vacuum/pressure source 34 may include any number of compressors (not shown) for drawing suction and for supplying pressurized air. In other embodiments, another form of actuation may be provided other than pressurized air. The suction cups 26 are coupled with the vacuum/pressure source 34 by conduits 36 and include openings 37 that are open to the conduits 36. In operation, the robot 22 locates the fixture 30 against the vehicle panel 28 and the vacuum/pressure source 34 is engaged to securely hold the fixture 30 in position. The suction cups 26 are compliant to avoid damage to the vehicle panel 28 and to reduce leakage. The fixture 30 includes actuators 35, 38 that are coupled with a pressurized air source from the vacuum/pressure source 34 through conduits 39, 41, respectively. The actuators 38 are operated to move the suction module 32 relative to the fixture 30 and the vehicle panel 28 to apply a component (such as the emblem shown in FIG. 2) thereto. The actuator 35 is used for releasably locking the suction module 32 to the fixture 30.

Referring to FIG. 2, the type of component manipulated by the robotic system 20 and applied to the vehicle panel 28, varies and in the current embodiment is an emblem 40. The emblems applied by the robotic system 20 may have a variety of configurations, and therefore, the ability to pick-up and manipulate the different configurations is provided herein. In the embodiment of FIG. 2, the emblem 40 is a nameplate with a set of letters 42 that are presented in an emblem package 44 shown in an exploded view for visibility of the individual components. The emblem package 44 includes a foam carrier 46 that surrounds and locates the letters 42 of the emblem 40 relative to each other, and includes a discrete opening 48 for each respective letter 42. Each letter 42 has a corresponding and mirror shaped adhesive layer 50 for securing the letter 42 to the vehicle panel 28. A tape liner 52 is attached to the adhesive layer 50 for protection during handling prior to being applied to the vehicle panel 28, and therefore requires removal in advance of application. A face liner 54 is adhered to the face of the letters 42 for protection during shipping and handling and requires removal along with the foam carrier 46 after application of the emblem 40.

A mating suction module 32 and emblem package 44 pair 56 is illustrated in FIG. 3, to which reference is additionally directed. In this embodiment, the emblem package 44 is generally of a flat rectangular shape. The suction module 32 includes a body 58, a front section 60 and an end-effector interface 62. The body 58 is rigid and is shaped similarly to the emblem package 44. The front section 60 is made of a resilient material and includes a face 64 shaped to mate with the emblem package 44. The body 58 is curved to match the curvature of the vehicle panel 28. The face 64 includes a number of openings 66 through which suction is passed for capturing the emblem package 44 as described below in greater detail.

Another mating suction module 70 and emblem package 72 pair 74 is illustrated in FIG. 4, to which reference is directed. In this embodiment, the emblem package 72 is generally of a round domed shape. The suction module 70 includes a body 76, a front section 78, and an end-effector interface 80. The body 76 is rigid and is shaped similarly to the emblem package 72. The front section 78 is made of a resilient material and includes a face 82 shaped to mate with the emblem package 72 that is curved to match the shape of the vehicle panel 28. The face 82 includes an number of openings 84 through which suction is passed for capturing the emblem package 72 as described below in greater detail. In this embodiment, the emblem package 72 includes an emblem 86 that has the round, domed shape and a tape liner 88 covering an adhesive layer (not shown) on the back of the emblem 86. Referring additionally to FIG. 5, a front view of the face 82 is illustrated. The face 82 includes the openings 84 and an imprint/groove network 90 recessed into the face 82 and shaped to match the front 92 of the emblem 86. Providing a shaped mating face 82 improves pick-up and holding of the emblem package 72. The openings 84 extend across the face 82 providing suction to act on the emblem 86.

Figure 6:
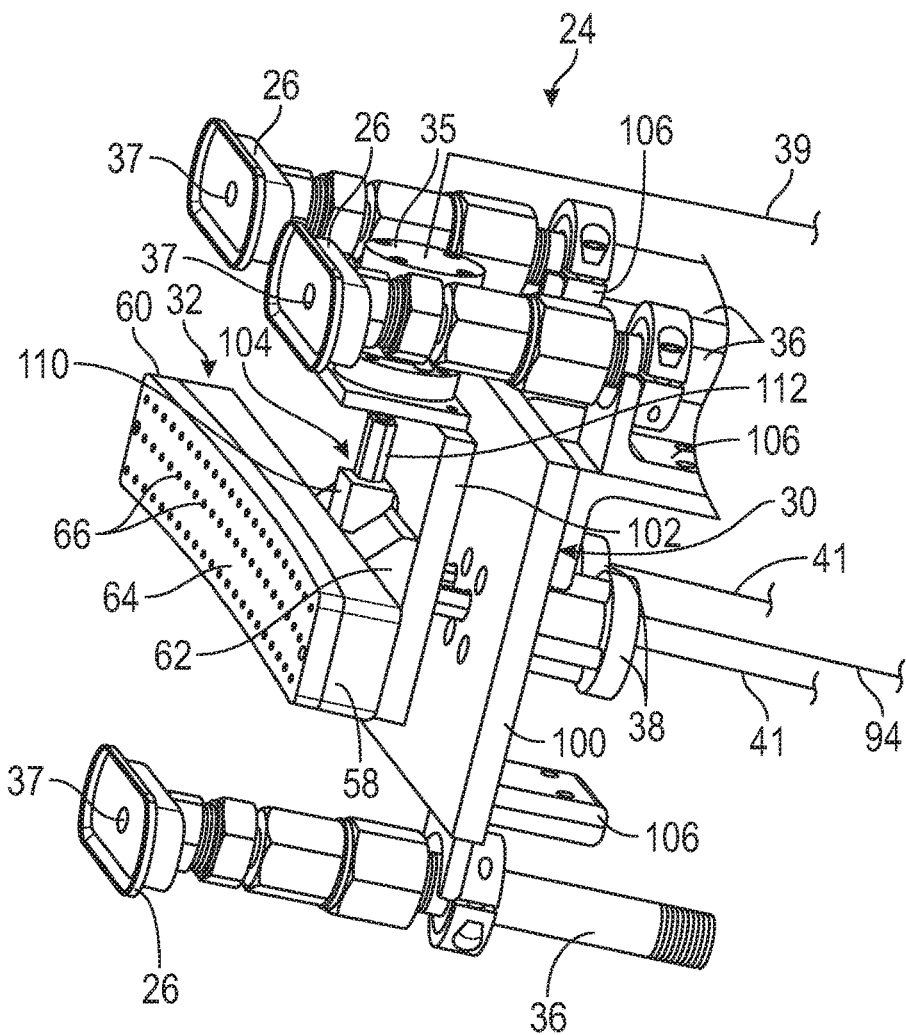
FIG. 6 is a perspective illustration of the end-effector of the robotic system of FIG. 1, in accordance with various embodiments.

Referring to FIG. 6, the end-effector 24 is shown in isolation. As described above, the end-effector 24 includes the fixture 30, the suction module 32, the suction cups 26, the actuators 35, 38 and the conduits 36, 39, 41. The fixture 30 generally has base, in this embodiment configured as a base plate 100, a mounting, in this embodiment configured as a mounting plate 102 selectively moveable relative to the base plate 100, and a clamp 104. The fixture 30 also includes brackets 106 for mounting the suction cup 26 to the base plate 100 and for connecting with the conduits 36. The suction module 32 is selectively mounted to the mounting plate 102 and is releasably secured by the clamp 104. The actuators 38 are operable via air pressure supplied through the conduits 41 to selectively move the mounting plate 102 and the suction module 32 relative to the base plate 100. The clamp 104 includes a locking block 110 that releasably engages the suction module 32 and selectively locks it to the fixture 30. The locking block 110 is coupled with an actuator 35 by a rod 112 and is selectively moveable by the actuator 35 in response to air pressure supplied through the conduit 39 to alternately lock and release the suction module 32.

Figure 7:
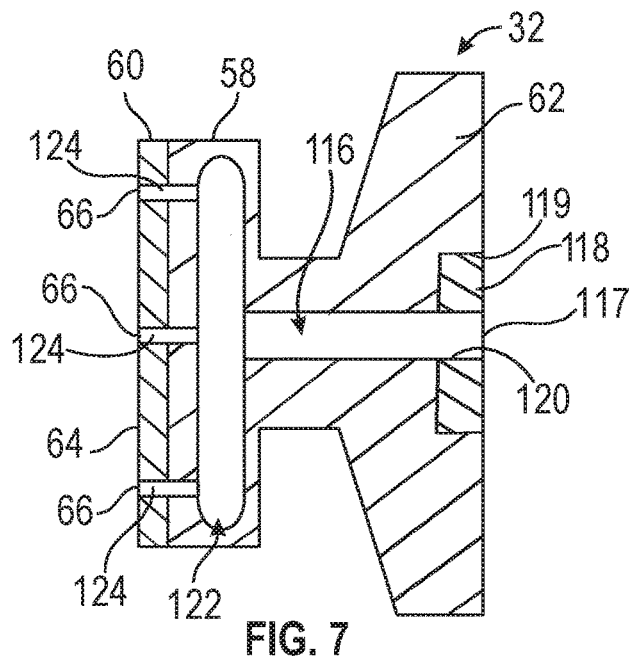
FIG. 7 is a cross sectional illustration of the pass-through suction module included in FIG. 6, in accordance with various embodiments.
Figure 8:
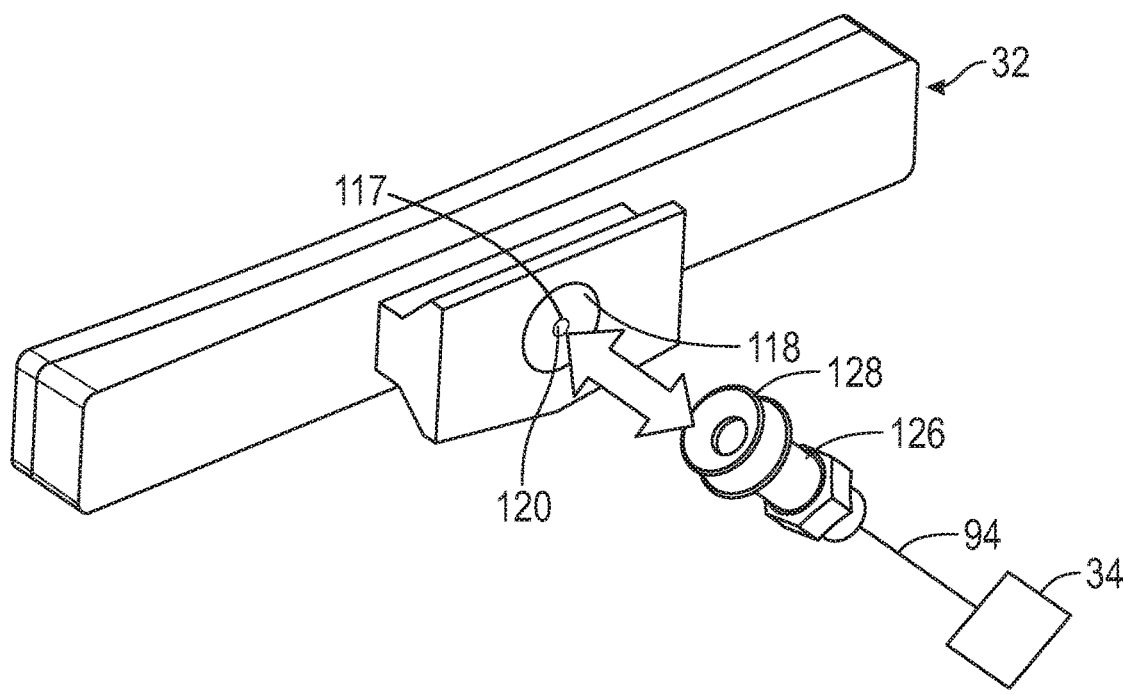
FIG. 8 is a detail, exploded view of a suction connection to the pass-through suction module of FIG. 3, in accordance with various embodiments.

As illustrated in FIG. 7, the suction module 32 defines an internal passage system 116 connected with the openings 66 through the face 64 and with an opening 117 through a rear coupling receptacle 118. As such, the suction module 32 is a pass-through suction module because it passes through suction from the rear coupling receptacle 118 to the openings 66. The internal passage system 116 includes a main passage 120 extending from the opening 117, through the rear coupling receptacle 118, and forward through the end-effector interface 62 and into the body 58. A manifold 122 is defined in the body 58 to distribute vacuum channels across its width and height. In the current embodiment, the manifold 122 is an enlarged internal cavity that extends across much of the width and the height of the body 58. A series of forward passages 124 connect the manifold 122 with the openings 66. In other embodiments, the manifold 122 may comprise a number of lateral and longitudinal passages connecting the forward passages 124 with the main passage 120. It has been found that forming the manifold 122 as the enlarged internal cavity facilitates using additive manufacturing/3D printing techniques to form the suction module 32. As shown in FIG. 8, the main passage 120 is coupled with the vacuum/pressure source 34 by a coupler 126 that couples with the rear coupling receptacle 118. The rear coupling receptacle 118 is defined by a rubber or other soft material pad/insert 119 to help provide a secure air seal between the suction cup 128 and the suction module 32, and may be 3D printed together with the body 58 and the end-effector interface 62. The coupler 126 includes a suction cup 128 that releasably engages with the internal passage system 116 and fits with the rear coupling receptacle 118 when the suction module 32 is coupled with the fixture 30. In some embodiments, a recess may be provided at the rear coupling receptacle 118 for the suction cup 128 to seat within.

Figure 9:
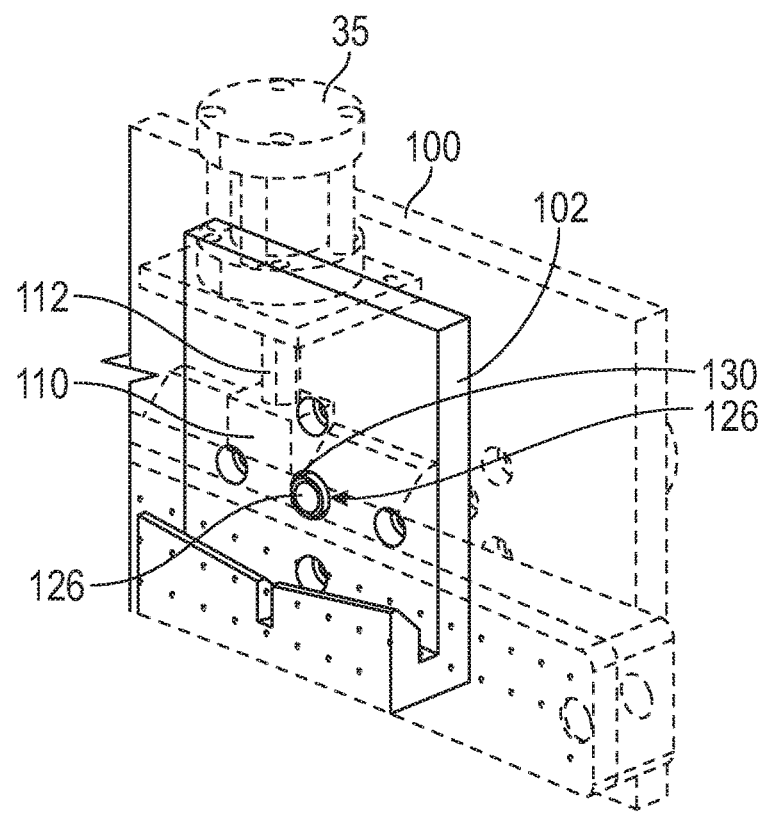
FIG. 9 is a detail, perspective view of a mounting plate for connection between the end-effector of FIG. 6 and the pass-through suction module of FIG. 3, in accordance with various embodiments.
Figure 10:
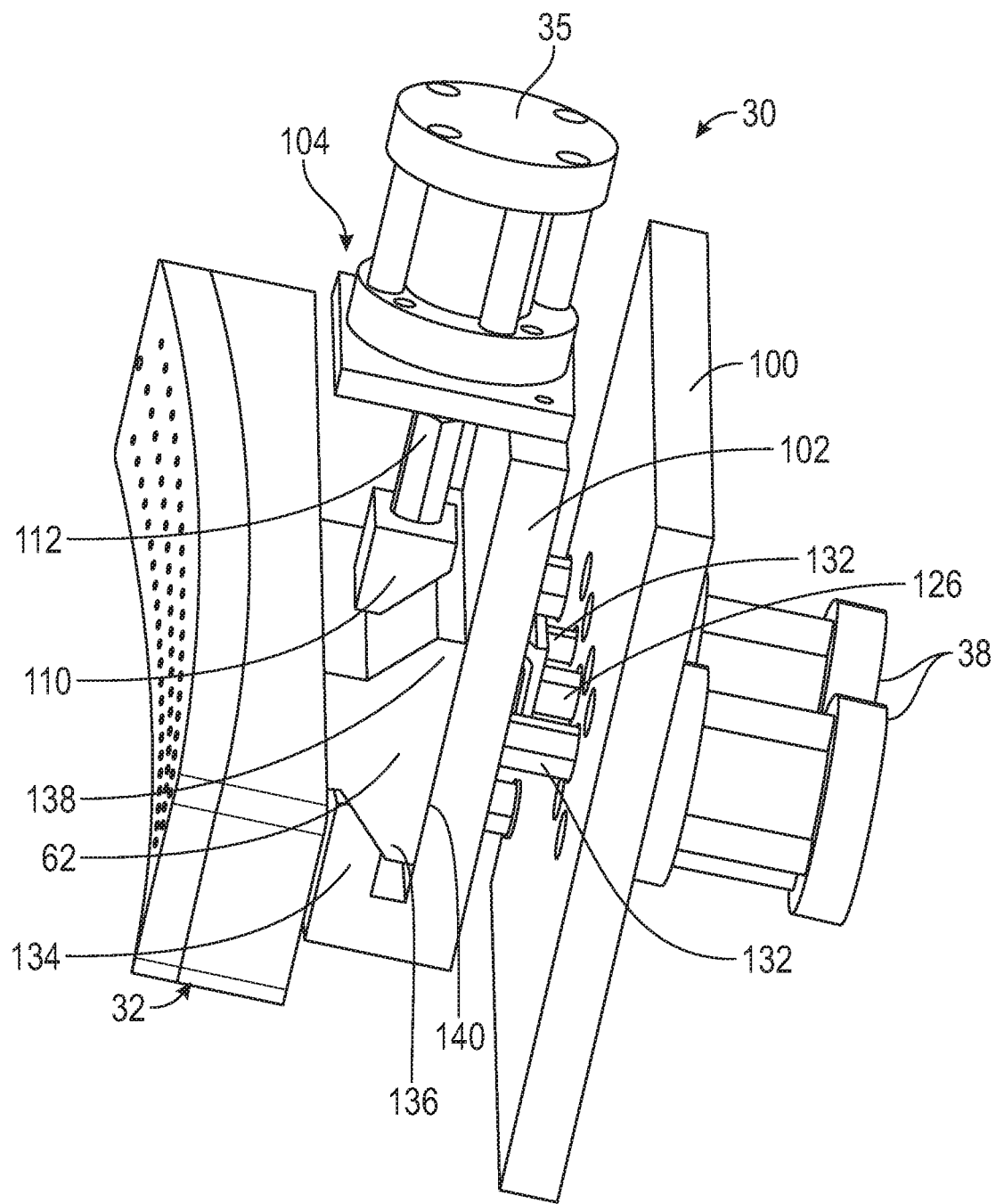
FIG. 10 is another detail, perspective view of a connection between the end-effector of FIG. 6 and the pass-through suction module of FIG. 3, in accordance with various embodiments.

Referring to FIG. 9, aspects of the fixture 30 are shown, ready for coupling with a suction module, such as the suction modules 32, 70. The mounting plate 102 includes an opening 130 through which coupler 126 extends, with the suction cup 128 exposed for coupling with the respective suction module 32, 70. Referring additionally to FIG. 10, the suction module 32 is shown mounted in the fixture 30. The actuators 38 are fixed to the base plate 100 and include rods 132 that extend through the base plate 100 and that are connected with the mounting plate 102. The mounting plate 102 includes a hook 134 into which the lower section 136 of the end-effector interface 62 is engaged. The locking block 110 of the clamp 104 engages with the upper section 138 of the end-effector interface 62 and under operation of the cylinder-type actuator 35 via the rod 112 locks the suction module 32 to the fixture 30 in cooperation with the hook 134. The hook 134, the locking block 110 and the end-effector interface 62 have complementary angled surfaces to wedge the back surface 140 of the end-effector interface 62 against the mounting plate 102.

In operation, the robotic system 20, equipped with the end-effector 24, couples with a suction module, such as one of the suction modules 32, 70 as is appropriate for manipulating the specific emblem to be applied to its vehicle. The actuator 35 is operated to draw in the rod 112 lifting the locking block 110 away from the hook 134 opening the clamp 104. When a suction module 32 is being removed from the fixture 30, the robotic system 20 will move it to a designated storage position before opening the clamp 104 to place it in an open/unclamped state to release and place the suction module 32. The robotic system 20 moves the end-effector 24 to the next desired suction module and engages it with the back surface 140 against the mounting plate 102. The clamp 104 is operated to capture the end-effector interface 62 between the hook 134 and the locking block 110. This action automatically couples the coupler 126 with the selected suction module 32, 70.

The robotic system 20 next moves the end-effector 24 to pick up an emblem package 44, 72. The emblem packages 44, 72 may be presented to the robotic system 20 in a designated orientation for mating with the suction module 32, 70, and may be delivered by an automated feed system (not shown) or manually. Alternatively, in a number of embodiments, the robotic system 20 may include machine vision (not shown) to capture the emblem package 44, 72. At this stage the actuators 38 have retracted the mounting plate 102 toward the base plate 100. The presented emblem package 44, 72 is engaged by the robotic system 20 by placing the face 64 of the respective suction module 32, 70 against the front of the emblem package 44, 72. Suction is activated to pull the emblem package 44, 72 against the face 64. The robotic system 20 next moves to remove the tape liner 52, 88. The robotic system 20 locates the back of the tape liner 52, 88 against a removal tool (not shown), such as a suction cup, mechanical stripper, etc. With the removal tool holding onto the tape liner 52, 88, the robotic system 20 pulls the emblem 40, 86 away releasing the tape liner and exposing the adhesive layer 50.

The robotic system 20 next moves to position and apply the emblem 40, 86 to the vehicle panel 28. The suction cups 26 engage the vehicle panel 28 and suction is drawn through them to hold the end-effector 24 against the vehicle panel 28. The actuators 38 are operated to move the mounting plate 102 and the suction module 32 away from the base plate 100 pushing the emblem 40, 86 against the vehicle panel 28. The emblems 40, 86 have a relatively high wet-out force and to generate the force, the line pressure in the conduits 41 may be set, for example to deliver 8.5 pounds push force to the emblem 40, 86. When the desired force level for wet-out is reached, the suction through the suction module 32 is suspended and the robotic system 20 moves the end-effector 24 away leaving the applied emblem 40, 86 in place.

Figure 11:
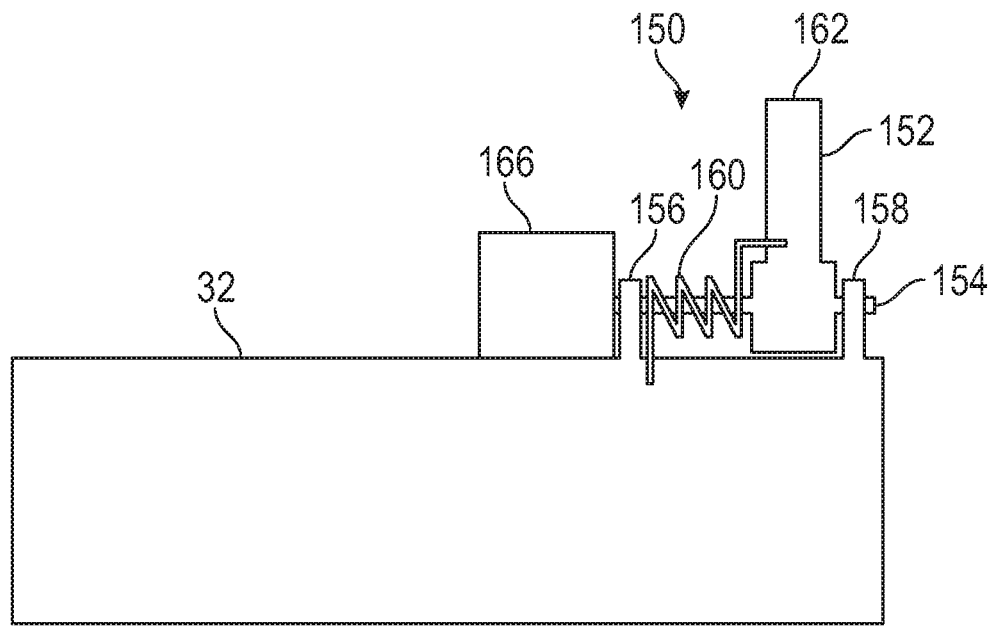
FIG. 11 is a detail, front view of a stripping system for the robot end-effector of FIG. 1, in accordance with various embodiments.
Figure 12:
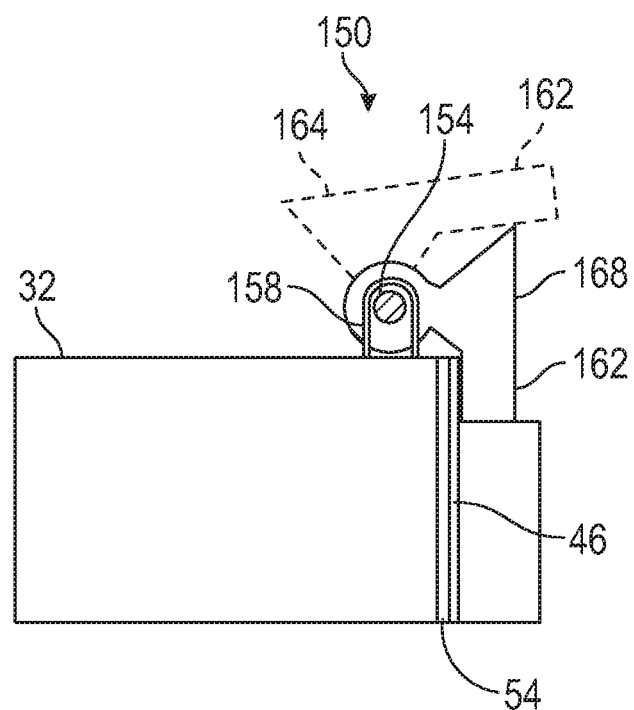
FIG. 12 is a detail, side view of the stripping system of FIG. 11, in accordance with various embodiments.

In the case of applying the emblem 86, there is no foam carrier or face liner to remove. In the case of the emblem 40, the foam carrier 46 and the face liner 54 remain in place on the emblem 40 as applied to the vehicle panel 28. In a number of embodiments, a stripper 150, as illustrated in FIGS. 11 and 12, is mounted on the suction module 32. Mounting the stripper 150 on the suction module 32 automatically matches the stripper 150 to the emblem package 44 being manipulated so the stripper 150 may be designed according to the specific emblem package 44 characteristics. In this embodiment, the stripper 150 includes a gripper 152 rotatably mounted on a shaft 154 that is fixed relative to the suction module 32 by a pair of brackets 156, 158. The gripper 152 includes an extending arm 162 that is biased to return to an open position 164 by a spring 160. The spring 160 includes one end that engages the suction module 32 and another end that engages the arm 162. An actuator 166 is operable to move the arm 162 against the force of the spring 160 to move the arm 162 to a closed/gripping position 168. The actuator 166 may be of various types and may include an electric, pneumatic or other, to drive a rotary motion and may include an appropriate drivetrain. When the emblem package 44 is picked up by the robotic system 20, the arm 162 may be rotated to the gripping position 168 clamping onto the foam carrier 46 and/or the face liner 54. After application of the emblem 40 to the vehicle panel 28, as the robotic system 20 withdraws the end-effector 24 the stripper 150 pulls the foam carrier 46 and/or the face liner 54 off, exposing the emblem 40, which alone is left on the vehicle panel 28.

Figure 13:
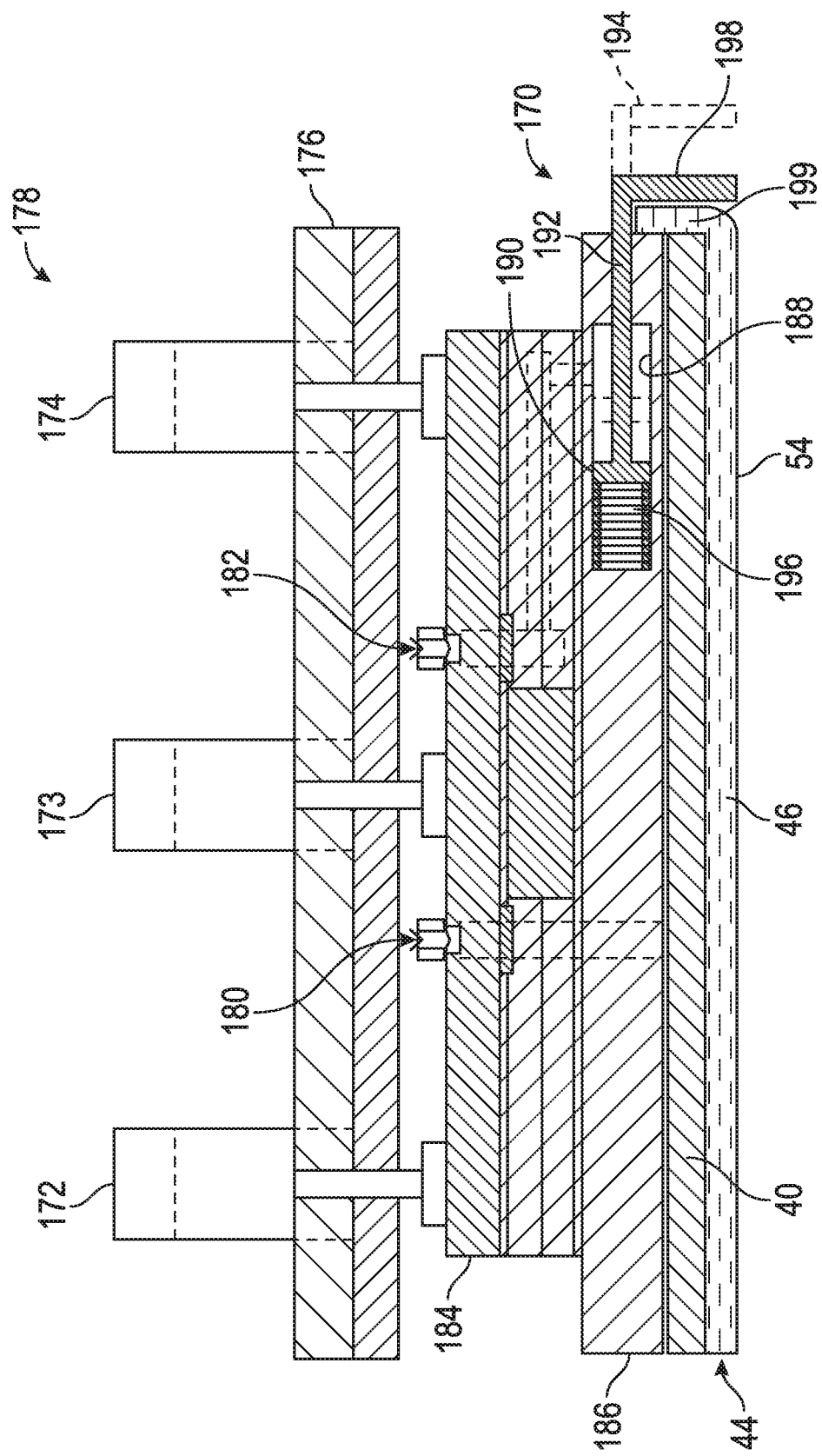
FIG. 13 is a detail, front view of an alternate stripping system for the robot end-effector of FIG. 1, in accordance with various embodiments.

Referring to FIG. 13, schematically illustrated is another embodiment of a stripper 170. In this embodiment, three wet-out cylinders 172-174 are included on the base plate 176 of the fixture 178. A vacuum fitting 180 and a pressure fitting 182 are included for connection with the vacuum/pressure source 34. The pressure fitting 182 provides a connection for delivering compressed air through the mounting plate 184 and the suction module 186 to operate the stripper 170. A cylinder chamber 188 is defined in the suction module 186 and carries a piston 190 with an attached arm 192. The arm 192 is biased to an open position 194 by a spring 196 and is moved to a closed/gripping position 198 by application of air pressure through the pressure fitting 182. When in the gripping position 198, the arm clamps onto the end 199 of the foam carrier 46 and the face liner 54. After application of the emblem 40 to the vehicle panel 28, the robotic system 20 withdraws the fixture 178 and pulls the foam carrier 46 and/or the face liner 54 off, exposing the emblem 40, which alone is left on the vehicle panel 28.

Through the foregoing embodiments, an automatic robotic system is provided for the application of products such as emblems. A robot end-effector is adapted to receive various exchangeable suction modules, each configured for a specific product. The robot moves the end-effector to capture a specific suction module designed to pick up a specific emblem and place it onto the matching product surface for application. The suction modules may include an internal channel network and therefore, deliver suction to a large portion of the emblem surface features. The suction module may include an integral stripper for removing disposable parts of the emblem package. The system enables automatic emblem installation using collaborative robots in general assembly that efficiently, accurately and repeatably carries out operations according to tight specifications.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof

What is claimed is:

1. A robotic system for manipulating plural component variations, the system comprising:
    a set of suction modules, each suction module in the set of suction modules shaped to mate with one component variation of the plural component variations, each suction module in the set of suction modules having a front side with a face shaped to match and mate with the one component variation, each suction module in the set of suction modules having a rear side with a coupling connectable with a suction line, wherein at least one opening extends through the face, wherein the each suction module in the set of suction modules is shaped different than other suction modules in the set of suction modules and defines internal passages connecting the coupling with the at least one opening through the face; and
    a mounting on the robotic system, wherein the suction modules in the set of suction modules are interchangeable so that at a given time, one suction module in the set of suction modules is selectively mounted to the mounting and releasably secured thereto, wherein the robotic system selectively carries the one suction module in the set of suction modules, wherein the one suction module in the set suction modules has a specific shape that corresponds to one individual component variation of the plural component variations.

2. The system of claim 1, comprising an end effector having a base, a clamp, and a set of three engagement devices mounted to the end-effector for locating the end-effector relative to a mounting surface for the one component variation, wherein the end-effector carries the mounting for receiving the one suction module in the set of suction modules.

3. The system of claim 1, wherein the mounting comprises a mounting plate that includes a hook, and the clamp includes a locking block, wherein the one suction module in the set of suction modules is selectively clamped between the locking block and the hook.

4. The system of claim 3, wherein the locking block is connected with an actuator by a rod, wherein the actuator is configured to move the locking block to alternatively lock and release the one suction module in the set of suction modules relative to the mounting plate.

5. The system of claim 1, wherein the each suction module in the set of suction modules includes a groove network recessed into the face, wherein the groove network is shaped to match features of the one component variation.

6. The system of claim 1, comprising an end effector having a base, a mounting selectively moveable relative to the base, a clamp, and at least one actuator mounted to the base and configured to selectively move the mounting and the one suction module in the set of suction modules relative to the base.

7. The system of claim 6, wherein the at least one actuator comprises a rod extending through the base and connected with the mounting plate.

8. The system of claim 1, wherein each suction module in the set of suction modules comprises:
    a body that is rigid;
    an interface on a back side of the body and connectable with the mounting; and
    a front section on a front side of the body, the front section comprising a resilient material.

9. The system of claim 8, wherein the internal passages extend through the body, the end-effector interface, and the front section.

10. The system of claim 1, wherein the one component variation comprises an emblem carried in an emblem package with the emblem surrounded by a foam carrier, and the system comprises a gripper on the one suction module in the set of suction modules, the gripper including an arm selectively moveable between an open position and a clamped position, wherein when in the clamped position the arm clamps onto the foam carrier.

11. The system of claim 10, comprising a spring biasing the arm to the open position, and an actuator selectively moving the arm to the closed position.

12. A robotic system for manipulating plural component variations, the system comprising:

a suction module shaped to mate with one component variation of the plural component variations, the suction module having a front side with a face shaped to match and mate with the one component variation, the suction module having a rear side with a coupling connectable with a suction line, wherein at least one opening extends through the face, wherein the suction module defines internal passages connecting the coupling with the at least one opening through the face to enable suction to pass-through the suction module;

an end-effector having a base plate, a mounting plate selectively moveable relative to the base plate, and a clamp, wherein the suction module is selectively mounted to the mounting plate and releasably secured by the clamp, wherein the end-effector selectively carries a variety of suction modules, each one of which corresponds to an individual component variation of the plural component variations; and at least one actuator mounted to the base plate and configured to selectively move the mounting plate and the suction module relative to the base plate, wherein the one component variation comprises a component carried in a component package with the component surrounded by a carrier, and the system comprises a gripper on the suction module, the gripper including an arm selectively moveable between an open position and a clamped position, wherein when in the clamped position the arm clamps onto the carrier.

13. The system of claim 12, comprising a set of three suction cups mounted to the end-effector, the suction cups locating the end-effector relative to a mounting surface for the one component variation, the suction cups coupled with a vacuum source for holding the end-effector against the mounting surface, the suction cups having vacuum openings that are open to the vacuum source.

14. The system of claim 12, wherein the mounting plate includes a hook, and the clamp includes a locking block, wherein the suction module is selectively and releasably clamped between the locking block and the hook.

15. The system of claim 14, wherein the locking block is connected with an actuator by a rod, wherein the actuator is configured to move the locking block to alternatively lock and release the suction module relative to the mounting plate.

16. The system of claim 12, wherein the includes a groove network recessed into the face, wherein the groove network is shaped to match features of the one component variation.

17. The system of claim 12, wherein the at least one actuator comprises a rod extending through the base plate and connected with the mounting plate.

18. The system of claim 12, wherein the suction module comprises:
a body that is rigid;
an end-effector interface on a back side of the body and connectable with the mounting; and
a front section on a front side of the body, the front section comprising a resilient material,
wherein the internal passages extend through the body, the end-effector interface, and the front section.

19. The system of claim 12, wherein the component comprises an emblem.

20. A robotic system for manipulating plural emblem variations, the system comprising:
a suction module shaped to mate with one emblem variation of the plural emblem variations, the suction module having a front side with a face shaped to match and mate with the one emblem variation, the suction module having a rear side with a coupling connectable with a suction line, wherein at least one opening extends through the face, wherein the suction module defines internal passages connecting the coupling with the at least one opening through the face to enable suction to pass-through the suction module;
an end-effector having a base plate, a mounting plate selectively moveable relative to the base plate, and a clamp, wherein the suction module is selectively mounted to the mounting plate and releasably secured by the clamp, wherein the end-effector selectively carries a variety of suction modules, each one of which corresponds to an individual emblem variation of the plural emblem variations,
wherein the one component variation comprises an emblem carried in an emblem package with the emblem surrounded by a foam carrier, and the system comprises a gripper on the suction module, the gripper including an arm selectively moveable between an open position and a clamped position, wherein when in the clamped position the arm clamps onto the foam carrier.

* * * * *